US012664904B2

(12) United States Patent
Quigley et al.

(10) Patent No.: US 12,664,904 B2
(45) Date of Patent: Jun. 23, 2026

(54) VEHICLE MONITOR SYSTEM

(71) Applicant: Transportation IP Holdings, LLC, Norwalk, CT (US)

(72) Inventors: Jason Quigley, Erie, PA (US); John Lahut, Ballston Spa, NY (US); Ryan Paul Hurst, Lee's Summit, MO (US); David Joseph Schroeck, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 250 days.

(21) Appl. No.: 18/470,116

(22) Filed: Sep. 19, 2023

(65) Prior Publication Data

US 2024/0177621 A1 May 30, 2024

Related U.S. Application Data

(60) Provisional application No. 63/428,619, filed on Nov. 29, 2022.

(51) Int. Cl.
*G08G 9/00* (2006.01)

(52) U.S. Cl.
CPC .................................... *G08G 9/00* (2013.01)

(58) Field of Classification Search
CPC .............. G08G 9/00; G05B 2219/2637; G05B 19/042; G07C 5/008
See application file for complete search history.

(56) References Cited

U.S. PATENT DOCUMENTS

| | | | | |
|---|---|---|---|---|
| 10,937,259 | B1 | 3/2021 | Horvatich et al. | |
| 2008/0103651 | A1 | 5/2008 | Pillar et al. | |
| 2014/0249693 | A1* | 9/2014 | Stark | G08G 5/32 701/2 |
| 2017/0192427 | A1 | 7/2017 | Bivans et al. | |
| 2018/0022405 | A1* | 1/2018 | Gecchelin | B62D 47/025 701/23 |

OTHER PUBLICATIONS

European Search Report dated Apr. 17, 2024 for corresponding European Patent Application No. 23207535.8.

* cited by examiner

*Primary Examiner* — Christian Chace
(74) *Attorney, Agent, or Firm* — K&L Gates LLP

(57) ABSTRACT

A vehicle control system and method may receive state information from a vehicle group having one or more vehicles. The state information may indicate an operational parameter of one of the vehicles. The controller may direct a display device to present one or more statuses of the one or more vehicles based at least in part on the state information that is received by the controller. This state information may be used to notify an operator of a potential component fault before continued operation of the vehicle group further damages the component or a vehicle. In another example, the state information may be used to control or change operation of one vehicle based on the state or status of another vehicle, such as by changing movement of one or more drones in a swarm responsive to a lower state of charge of another drone in the same swarm.

20 Claims, 5 Drawing Sheets

VEHICLE MONITOR SYSTEM

CROSS-REFERENCE TO RELATED APPLICATIONS

This application claims priority to U.S. Provisional Application No. 63/428,619 (filed 29 Nov. 2022), the entire disclosure of which is incorporated herein by reference.

BACKGROUND

Technical Field

The subject matter described herein relates to systems and methods that monitor parameters of vehicles and vehicle groups and based on the parameters, inform decisions regarding the operation of one or more vehicles in the vehicle groups.

Discussion of Art

Some monitoring systems receive sensor information to track operation of vehicle groups or systems. For example, some monitoring systems can receive temperatures, speeds, or the like, of a vehicle and then display those to the vehicle operator. Operators can control based on the information that is received and presented. But these systems may not obtain, or display information related to other vehicles in the same vehicle system. As a result, any information indicating a problem or decreased operative state of another vehicle in the same vehicle system may not be readily accessible for presentation to operators onboard a different vehicle until later.

This can delay the discovery and/or remediation of repairs and/or maintenance needed to keep the vehicle system operational. For example, one vehicle operator may be unaware of a component failure or decreased operation of a component another vehicle in the vehicle system. The vehicle system may continue moving without knowledge of the deteriorated condition of the component. This may further damage components (thereby potentially further extending repair or maintenance timelines relative to earlier discovery of the failed or damaged components). It may be desirable to have a system and method that differs from those that are currently available.

BRIEF DESCRIPTION

In one example, a vehicle control system may include a controller having one or more processors that can receive state information from a vehicle group having one or more vehicles. The state information may indicate an operational parameter of one of the vehicles. The controller may direct a display device to present one or more statuses of the one or more vehicles based at least in part on the state information that is received by the controller.

In another example, a method may include receiving state information from vehicles arranged in a vehicle group. The state information may indicate the operational condition of one or more of the vehicles. The method also may include displaying one or more statuses of the vehicles in the vehicle group based at least in part on the state information that is received.

In another example, a control system may include a controller having one or more processors that can receive state information from a vehicle group formed from vehicles. The state information may indicate an operational parameter of a first vehicle of the vehicles. The controller may direct a display device onboard a second vehicle of the vehicles in the vehicle group to present one or more statuses of the one or more vehicles based at least in part on the state information that is received by the controller. The controller may receive operator input from an operator onboard the second vehicle to change or control movement of the vehicle group based on the one or more statuses that are displayed on the display device by the controller.

BRIEF DESCRIPTION OF THE DRAWINGS

The subject matter may be understood from reading the following description of non-limiting embodiments, with reference to the attached drawings, wherein below.

DETAILED DESCRIPTION

Embodiments of the subject matter described herein relate to control systems and methods that can receive and aggregate information about vehicles in a vehicle group, present that information onboard a vehicle in the vehicle group and/or at an off-board system, and/or may facilitate a change in operation or movement of the vehicle group based on the aggregated information. The information that is received and aggregated can include not only information related to performance or operation of the vehicles but can relate to positions or relative positions of the vehicles within the vehicle group. The information can be used to monitor operation of the vehicle group (e.g., from an onboard location and/or a remote location), to control operation of the vehicle group from an onboard location (e.g., control movement by providing information to an onboard operator who manually controls the vehicle group or by automatically controlling movement of the vehicle group from an onboard controller), and/or to control operation of the vehicle group from a remote, off-board location (e.g., control movement by providing information to an off-board operator who manually controls the vehicle group or by automatically controlling movement of the vehicle group from an off-board controller), While one or more examples described herein relate to rail vehicles and rail vehicle systems, other embodiments of the inventive subject matter may relate to other vehicle types and vehicle systems. In particular, one or more embodiments may relate to vehicles such as aircraft (including unmanned aerial vehicles or drones), automobiles, trucks, buses, agricultural vehicles, mining vehicles, marine vessels, and the like. Additionally, while one or more examples of the vehicle groups relate to mechanically coupled vehicles, not all embodiments are limited to mechanically coupled vehicles. One or more embodiments may or may alternatively relate to mechanically separate or spaced apart vehicles, such as a swarm of drones, a fleet of automobiles, a convoy or platoon of trucks, and the like.

Figure 1:
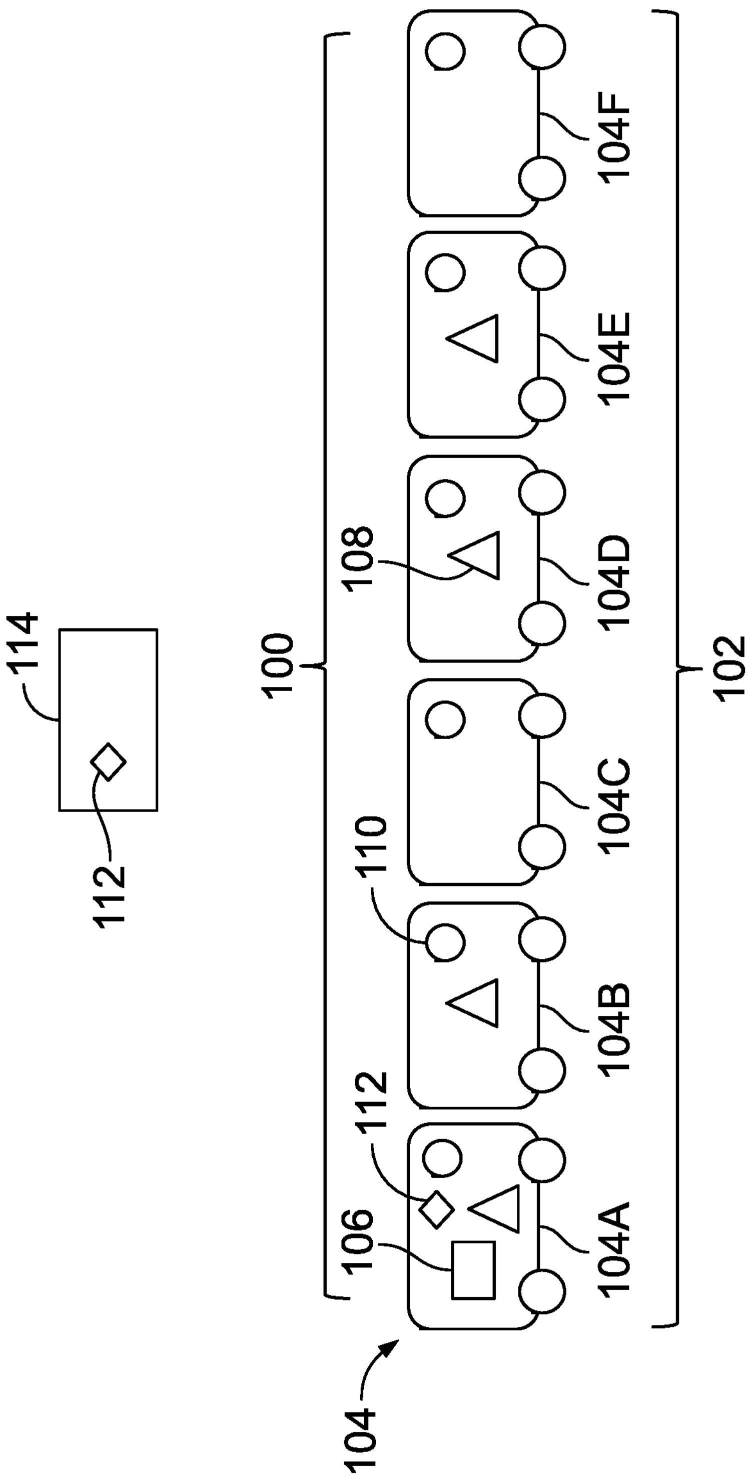
FIG. 1 illustrates one example of a vehicle control system.
Figure 2:
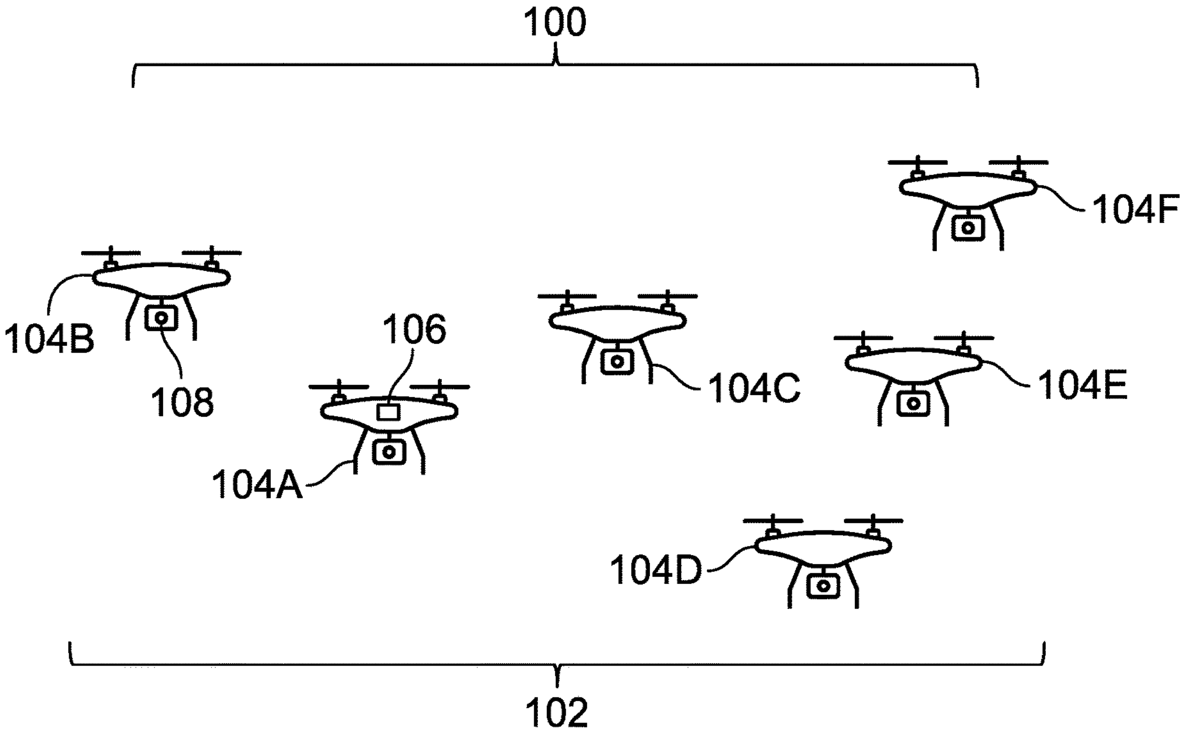
FIG. 2 illustrates another example of the vehicle control system shown in FIG. 1.

FIG. 1 illustrates one example of a vehicle control system 100. FIG. 2 illustrates another example of the vehicle control system shown in FIG. 1. The control system may be entirely disposed onboard a multi-vehicle group or system 102 formed from two or more vehicles 104 (e.g., vehicles

104A-F) that may be mechanically connected or that are separate from each other. The vehicles can represent propulsion-generating vehicles (e.g., locomotives, automobiles, trucks, mining vehicles, drones, and the like) and/or non-propulsion-generating vehicles (e.g., rail cars, trailers, and the like). FIG. 1 shows the vehicles as land-based vehicles, while FIG. 2 shows the vehicles as airborne vehicles, such as drones or other aircraft.

The control system may include a controller 106 that represents hardware circuitry including and/or connected with one or more processors (e.g., microprocessors, field programmable gate arrays, integrated circuits, and the like) that perform the operations described herein in connection with the controller. The controller may receive, calculate, or otherwise determine state information of the vehicles and/or components 108 of the vehicles. For example, one or more sensing devices 110 may be onboard different vehicles in the vehicle group for sensing operational parameters of the different vehicles. The operational parameters may be included in or may represent the state information. The operational parameters may indicate the states of operation or non-operation (e.g., failures, deteriorated conditions, unexpected or undesirable operations, and the like) of various components of the vehicles. The components can represent a variety of different devices, assemblies, and/or systems described herein.

As one example, the state information may indicate operation of a consuming device control signal communicated to one or more consuming devices of the vehicles as one example of a component of the vehicles. The consuming devices may consume energy or fuel to generate power. For example, a consuming device may be an engine that consumes one or more types of fuel for rotating a shaft; a motor that consumes electric energy to rotate a shaft, axle, wheel, and the like; a fuel cell that consumes hydrogen, oxygen, and the like.to generate electric energy; and the like. The state information may indicate operation of a generating device control signal communicated to one or more energy generating/production devices of the vehicles that are powered by the consuming devices to generate electric energy. Examples of generating devices may include generators, alternators, energy storage devices (e.g., batteries, battery cells, super capacitors, and the like), brakes (e.g., regenerative brakes that generate electric current), fuel cells (that generate electric current), and the like The state information that is obtained (e.g., by sensing devices) and communicated to the controller may include information indicative of a state of charge and/or a state of health of the energy storage devices and/or energy production devices of the vehicles (as additional examples of components of the vehicles). The state of charge can represent how fully charged or depleted the energy storage devices are, how much more charge the energy storage devices can receive for storage, and/or how much more energy the energy storage devices can provide to load(s).

The state of health of the energy storage devices can indicate how fully functional or operational the energy storage devices are. For example, a decreased value or number of the state of health can indicate that an energy storage device has a reduced storage capacity, a reduced charging rate, a reduced discharge rate, an elevated temperature or a decreased temperature (e.g., outside of an acceptable threshold range of temperatures), and the like, relative to one or more other energy storage devices, such as a newly manufactured energy storage device, an energy storage device having a greater value for the state of health, and/or an energy storage device having a temperature that is within the acceptable range.

The state of health of the energy production devices can indicate how fully functional or operational the energy production devices are. For example, a decreased value or number of the state of health can indicate that an energy production device is able to output electric current or potential to a lesser amount and/or at a reduced rate relative to one or more other energy production devices, such as a newly manufactured energy production device and/or an energy production device having a greater value for the state of health.

Some components of the vehicles may consume electric energy as loads of the energy storage devices, energy production devices, and the like. The state of such components may include how much energy the components are consuming, have consumed, the rate at which the components consume energy, or the like.

The components of one or more of the vehicles can represent propulsion systems of the vehicles, such as engines, motors, alternators, generators, propellers, and the like, that operate to propel or move the vehicles along surfaces, routes, airpaths, and the like. The state of health that is sensed and/or communicated to the controller can include a state of health of a propulsion system. This state of health can be a measurement or value indicative of how much propulsion, tractive effort, horsepower, and the like, that a propulsion system is or can generate (e.g., relative to a newly manufactured propulsion system or a propulsion system having a lower value or score for the state of health.

One or more of the vehicles in the vehicle group may be a tender vehicle that holds and carries energy sources for the propulsion-generating vehicles in the vehicle group (or outside of the vehicle group). The tender vehicle may be a non-propulsion-generating vehicle in one example, or alternatively may include a propulsion system that propels the tender vehicle. Examples of tender vehicles include an energy tender having energy storage devices that store electric current or potential for powering electric loads, a fuel tender having a tank that stores liquid and/or gas fuel for the propulsion system(s), energy production devices, and the like. The fuel may be a single fuel type in one embodiment and in other embodiments the fuel may be a mixture of a plurality of different fuels. In one example of a fuel mixture, the first fuel may be liquid, and the second fuel may be gaseous. A suitable liquid fuel may be diesel (regular, biodiesel, HDRD, and the like), gasoline, kerosene, dimethyl ether (DME), alcohol, and the like. A suitable gaseous fuel may be natural gas (methane) or a short chain hydrocarbon, hydrogen, ammonia, and the like. In one embodiment, fuel may be inclusive of stored energy as used herein. In that perspective, a battery state of charge, or a source of compressed gas, a flywheel, fuel cell, and other types of non-traditional fuel sources may be included. The state information about the tender vehicle(s) may include an amount, weight, volume, and the like, of the energy and/or fuel stored onboard one or more of the tender vehicles, temperatures of the energy storage devices, discharge or dispensing rates of the energy or fuel, charging or filling rates of the energy or fuel, and the like. Optionally, the state information can indicate a temporal limitation and/or a distance limitation based on the amount of energy or fuel stored in the tender. These limitations can indicate how much longer (e.g., temporal limitation) and/or farther (e.g., distance limitation) the vehicle group can travel based on the amount of stored energy and/or fuel.

Another example of a component onboard one or more of the vehicles may be a thermal management system. This system may include one or more devices that operate to change temperatures of components of the vehicles. For example, the thermal management system may include or represent fans, blowers, pumps that move coolant(s) or heated fluids through conduits, motors that move components to cooler or warmer areas, or the like, to cool or heat the components (e.g., resistive grids, energy storage systems, engines, and the like). The state information may include information on the state of health of the thermal management system, the temperature of the thermal management system, the temperature of one or more components that are cooled or heated by the thermal management system, the rotational or other operating speed of a blower or fan, and the like At least one of the vehicles may include an area or volume that is maintained at a designated temperature or within a designated range of acceptable temperatures for transportation of cargo or passengers. For example, a vehicle may include a refrigerated truck or space that is to be kept at a sufficiently low temperature to prevent spoilage of food, medication, or other perishable materials. As another example, a vehicle may transport passengers that want to travel within certain temperatures to avoid being too cold or too hot during travel. The state information may include the internal passenger volume temperature inside the vehicle where the passengers are located. As another example, a vehicle may transport plants or other cargo that needs to be kept at a temperature that is warmer than a designated temperature to prevent damage to the plants or cargo. The state information may include the state of health of the thermal management system that cools or heats the volumes in which the cargo or passengers are held, the temperatures or temperature readings of the volumes, changes in temperatures of the volumes, and the like Additional state information related to passengers or cargo can be a storage or carrying capacity of the vehicles. For example, the state information of a vehicle may indicate a number of passengers onboard the vehicle, a number of units of cargo onboard the vehicle, a weight of the passengers onboard the vehicle, a weight of the cargo onboard the vehicle, an available capacity to carry a number of additional units of cargo onboard the vehicle, an available capacity to carry an additional number of additional passengers onboard the vehicle, an available capacity to carry an additional weight of cargo onboard the vehicle, an available capacity to carry an additional weight of passengers onboard the vehicle, and the like Another example of state information can include the health state of one or more vehicles. As described above, the health state or state of health can indicate how well the vehicle is functioning relative to a newly manufactured vehicle or another vehicle. For example, the power or effort generated by the vehicle, the ability of the vehicle to communicate, the rate or bandwidth of communications with the vehicle, and the like. Can be different types of state information about the vehicle. The state information can indicate the state of a leading vehicle, such as the vehicle that directs and/or controls operations of one or more, or all, other vehicles in the same vehicle group.

Another example of a component onboard one or more of the vehicles may include a locator device. This device can output signals indicative of or representing a location of the vehicle, such as a geographic location (e.g., a longitude, latitude, altitude, and the like). The locator device can include a global navigation satellite system (GNSS) receiver (such as a global positioning system (GPS) receiver), a wireless triangulation system, a dead reckoning system, or the like. In one example, the locator device can be included in an end of vehicle device, such as an end-of-train device, which is disposed onboard the last vehicle in the vehicle group along the direction of travel of the vehicle system. The locator device can output an end location of the vehicle group along or relative to the direction of travel or movement of the vehicle group. In one embodiment, the position of the vehicles may be provided relative to a stationary or fixed reference point.

In addition or as an alternate to providing the location (e.g., geographic location) of a vehicle, the state information may include the position of the vehicle. The position of a vehicle may be the relative position of the vehicle relative to one or more other vehicles. For example, the position of a vehicle between two other vehicles, the position of a vehicle three vehicles behind another vehicle, the fifth vehicle from the lead vehicle, and the like. Stated differently, the location of a vehicle may be an absolute location while the position of a vehicle may be a relative location of the vehicle from a reference point, such as one or more other vehicles.

The position of the vehicle may be a unidirectional location or position of the vehicle. A unidirectional location or position of a vehicle may be the distance of the vehicle from a reference point along a single direction (or along one of opposing or opposite directions, or along a line). The reference point may be a fixed location or a mobile location, such as another vehicle. For example, the vehicle 104C in FIG. 1 may have a unidirectional location of two vehicles behind the vehicle 104A, one vehicle behind the vehicle 104B, one vehicle ahead of the vehicle 104D, two vehicles ahead of the vehicle 104E, and the like. Additionally or alternatively, this distance may be expressed in terms of distance (e.g., meters, feet, yards, and the like) instead of or in addition to the number of vehicles. The unidirectional location may represent the separation or distances between vehicles along a single direction, such as the direction of movement of the vehicle group, the direction in which the vehicle or vehicle group is facing (e.g., while stationary or moving), the orientation in which a route on which the vehicle or vehicle group is located, and the like. Optionally, the unidirectional location may represent the separation or distances between vehicles along opposing or opposite directions, such directions that are along and opposite the direction of movement of the vehicle group, directions that are along and opposite the direction in which the vehicle or vehicle group is facing (e.g., while stationary or moving), directions that are along and opposite the orientation in which a route on which the vehicle or vehicle group is located, and the like.

The position of the vehicle may be a multi-directional location or position of the vehicle. A multi-directional location or position of a vehicle may be the distance of the vehicle from a reference point along two or more directions. The reference point may be a fixed location or a mobile location, such as another vehicle. For example, the vehicle 104C in FIG. 2 may have a multi-directional location defined by distances along three or more directions from one or more other vehicles 104A-B, 104D-F. Optionally, the multi-directional location may be expressed as absolute locations, such as a longitude, latitude, altitude, or the like.

The unidirectional and/or multi-directional locations may be received by the controller for vehicles that are mechanically coupled with each other or that are mechanically separate from each other. The unidirectional and/or multi-directional locations may be communicated to the controller with additional information indicative of the state or condition of the vehicles. For example, the unidirectional and/or multi-directional locations may include or may be communicated to the controller with additional parameters, such as the moving speed, braking effort, propulsive effort, heading (e.g., whether the vehicle or another vehicle is moving to the left, right, up, or down), and the like, of the vehicle associated with the unidirectional and/or multi-directional locations that are reported, or of another vehicle (e.g., the vehicle that serves as a reference point from which the unidirectional and/or multi-directional locations are measured).

Other types of state information may include the status of acceleration systems (e.g., propulsion systems, such as the ability or capacity of the systems to accelerate at different rates), braking systems (e.g., the braking efforts that the brakes can apply, air pressures of reservoirs, brake cylinders, and the like), positions of electrical or mechanical switches in the vehicles, whether the vehicles are operating in a distributed power mode or other mode (where the distributed power mode directs a set of the vehicles in the vehicle group to produce a tractive effort or propulsion level), the states or positions of independent brake or other brake handles, brake air flow or braking capabilities, headings of individual vehicles relative to a map reference direction, an orientation of one or more vehicles, and the like. Additional examples include data or information communicated through or along a trainline of the vehicle group, positions or statuses of a brake handle or other brake input device (e.g., an independent brake handle position, an automatic brake handle position, etc.), a status of a distributed power arrangement or communications between the vehicles, an identification of motors or other propulsion devices that are deactivated or cutout, configuration information about the vehicles (e.g., make, model, year of manufacture, horsepower capacity, etc.), a measurement of a brake system or device (e.g., air pressure in an air brake system, air flow in the air brake system, etc.), a communication status (e.g., whether two or more vehicles are communicatively linked with each other, such as in a distributed power arrangement), a mode of operation of the vehicle group (e.g., whether the vehicle group is operating in a distributed power mode or another mode), a position or state of an engine control switch, a state or position of a reverser handle (or other device that controls a direction of movement of a vehicle), the presence or absence of a voltage or other signal on an engine run trainline, the presence or absence of a voltage or other signal on a generator field trainline, etc. Additional examples of state information are described herein.

The controller can receive the state information from the sensing devices, operators, or the like, and can use this information to inform an operator of the vehicle group, instruct the operator how to control or change operation (e.g., movement) of the vehicle group, and/or automatically control or change operation of the vehicle group. The control system may include an input and/or output device 112 disposed on one or more of the vehicles in the vehicle group and/or at an off-board location 114 (e.g., a dispatch facility, a remote control device that remotely controls operation of the vehicle or vehicle group, and the like). The input and/or output device can represent an electronic display, touchscreen, speaker, or the like, that presents information and optionally can receive input from an operator or one or more components of the vehicle group. The controller can direct the input and/or output device to present information to the operator by sending signals to the input and/or output device. This information can represent the status of the vehicles and/or components of the vehicles described herein and can be used by the operator and/or controller to monitor operation of the vehicles in the vehicle group, to identify vehicles or vehicle components that are operating at decreased levels or in other undesirable manners, to change operation of the vehicles, and the like, based on the state information.

Figure 3:
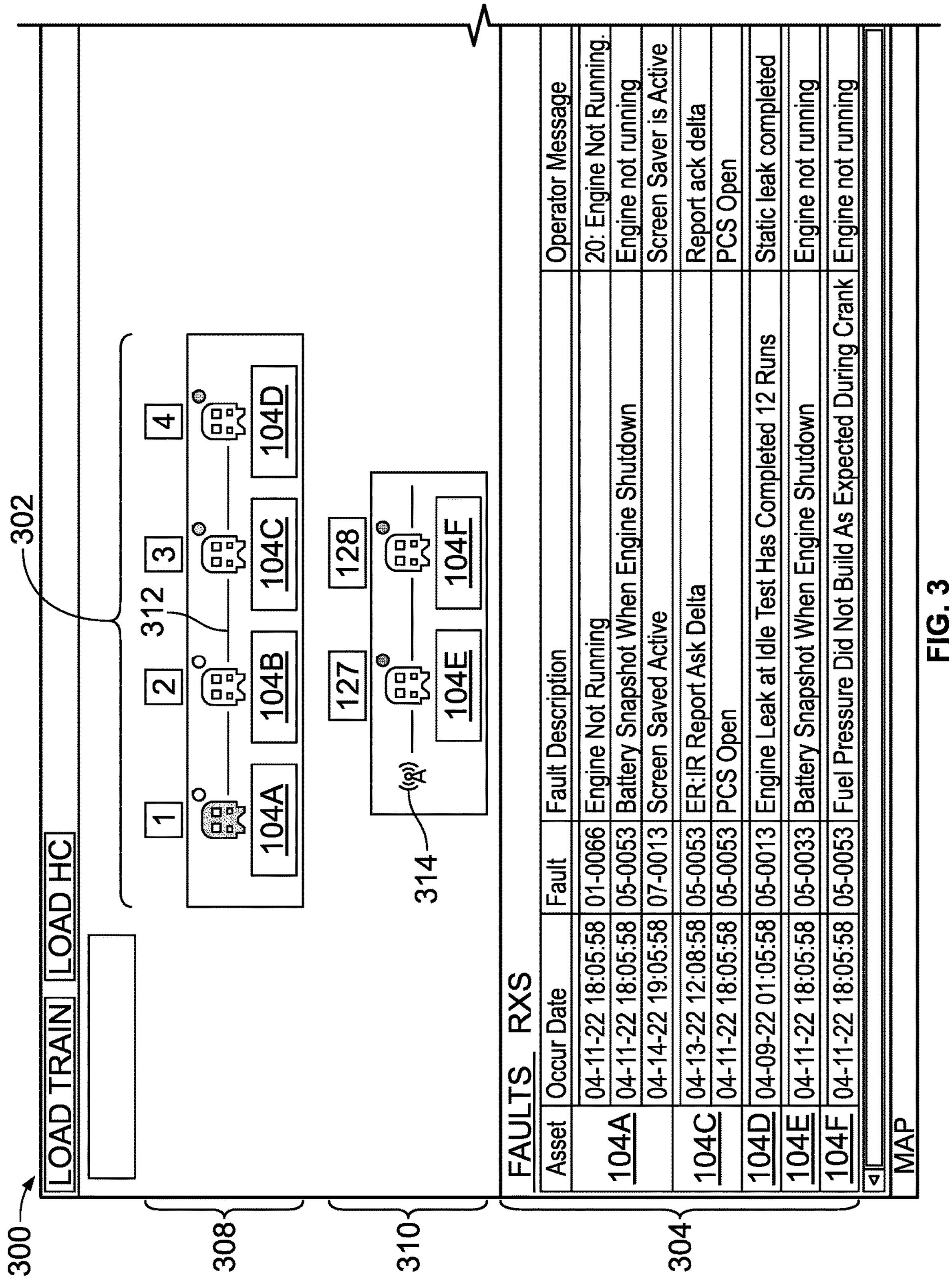
FIG. 3 illustrates one example of a graphical user interface (GUI) that may be presented on the input and/or output device by the controller to present the state information.
Figure 3:
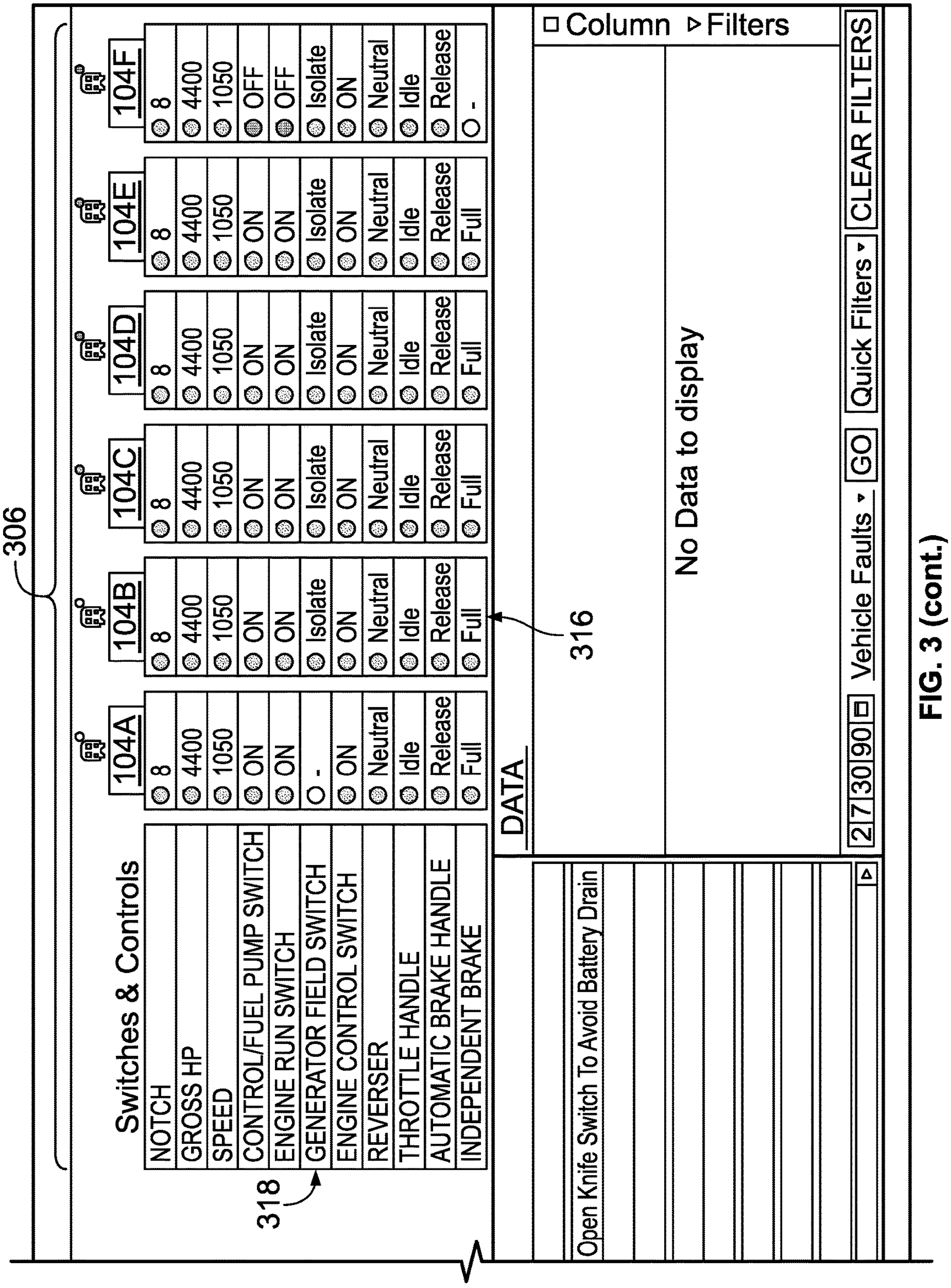

FIG. 3 illustrates one example of a human machine interface (HMI) or graphical user interface (GUI) 300 that may be presented on the input and/or output device by the controller to present the state information. The GUI includes several display regions 302, 304, 306 in which the state information or other information derived from the state information may be presented. The derived information can be aggregated, calculated, or otherwise formed based on the state information (instead of merely being a presentation of the actual state information). The first region 302 may graphically display arrangements of sets 308, 310 of the vehicles within the same vehicle group. Each set of the vehicles may be formed from some, but not all, of the vehicles within the same vehicle group. For example, a first set 308 of the vehicles includes the vehicles 104A-D which are communicatively coupled with each other by a conductive communication pathway 312, such as a wire, cable, bus, or the like. A second set 310 of the vehicles may include the vehicles 104E-F which are communicatively coupled with each other by another conductive communication pathway that is separate from, and not directly connected with the conductive communication pathway that connects the vehicles in the first set. The first and second sets of the vehicles may be communicatively coupled with each other by one or more wireless communication pathways or connections 314. Alternatively, the vehicle group may have only a single set of the vehicles and/or may have more than two sets of vehicles. Optionally, the vehicles in at least one of the sets and/or all vehicles in the group may be connected by wireless communication pathways instead of the conductive communication pathways.

The state information received by the controller can indicate which vehicles are communicatively coupled with each other, as well as the relative locations of the vehicles, whether the vehicles are connected by wireless or wired pathways, and the like. The controller can direct the input and/or output device to graphically present this state information in the first region of the GUI, as shown in one example in FIG. 1.

A second region 304 of the GUI can present a list, table, or other arrangement of identified faults. A fault may be an identified error, failure, deteriorated condition, operational anomaly, deteriorated health, or the like, that is included in the state information or that is derived from the state information. For example, the controller may identify and list a fault in the second region responsive to state information for a vehicle component indicating that the component is not operating (e.g., the engine of a vehicle is deactivated), that a leak in a thermal management system is identified or detected (e.g., responsive to a decrease in pressure of a heating or cooling medium in the thermal management system), or the like. The fault may be listed in a location associated with the vehicle having the component associated with the fault so that an operator or other viewer of the GUI can quickly and easily determine the location and potential impact of the fault on the continued operation of the vehicle group.

A third region 306 of the GUI can present a list, table, or other arrangement of the current states or statuses of certain components of the vehicles in the vehicle group. This region may include a table or other arrangement that associates states 316 of different components 318 of the vehicles with different ones of the vehicles so that the operator or other viewer of the GUI can quickly and easily identify the states of the components. As a few examples, this region of the GUI can display current throttle settings of propulsion systems of the vehicles, outputs of the propulsion systems (e.g., the torque or the tractive efforts generated by the propulsion systems), moving speeds of the vehicles, an active or inactive status of fuel pumps of the vehicles, an active or inactive status of engines of the vehicles (e.g., which may be detected by the sensing devices and/or controller based on the presence or absence of an electric potential conducted on a conductive pathway extending between the vehicles, such as an engine run switch), an active or inactive status of an energy production device (e.g., an indication of whether the alternators onboard the vehicles are active to produce or output electric current), a position of a directional controller of the vehicles (e.g., the position of a reverser handle, a gear switch, and the like), a position of a throttle or other handle of the vehicles, and/or statuses of brakes of the vehicles.

As shown in the GUI, the controller can direct the input and/or output device to present icons representative of the vehicles with the associated state information in a manner that allows the operator to identify relative locations of the vehicles quickly and easily in the vehicle group. For example, instead of listing the vehicles in another order, the state information of the vehicles may be presented in an order that matches or corresponds to the order in which the vehicles are arranged.

The controller can receive input from the operator (e.g., via the input and/or output device, or another input device) to change, and/or can automatically change, the state of one or more components based on the presented state information. For example, based on the state information indicating a fault or other undesirable state of one or more components of a vehicle (such as propulsion system, thermal management system, and the like), the controller can slow or stop operation of the components to avoid further damage to the components and/or other components of the vehicle. This may reduce the demand on, or prevent continued operation of, a faulty thermal management system from thermally damaging another component, derate or prevent continued operation of a deteriorated engine to avoid damaging the engine, and the like. A fault occurring in a component may be identified, triaged, and potentially addressed to reduce or avoid damage to the components.

The controller may repeatedly update or check for updates to the state information that is presented. Responsive to state information not being received or updated within a threshold period of time or window of time (e.g., a duty cycle, a communication cycle, and the like), the controller may instruct the operator or may automatically change a state or operating mode of the components for which the state information is not received or updated. For example, the components may be derated or switched to a safe operating mode (such that an artificial or other limit is placed on the maximum possible output of the components that is lower than a maximum upper limit on this output). This deration or safe operating mode may allow the vehicles to continue to operate in a reduced state, such as in a limp-home mode of operation, a coasting operation, or the like.

The controller may change movement or other states of one or more of the other vehicles to account or compensate for the changed state of the vehicle(s). For example, responsive to the controller identifying a faulty component, derating a component, or changing a component of a first vehicle to a safe operating mode, the controller may change a state or condition of component(s) of one or more other vehicles to account or compensate for the faulty component, derated component, or safe operating mode component. The controller can base which components of the other vehicles that are changed and/or the degree or amount of change on relative locations between the first vehicle and the other vehicles. For example, if a locomotive has a derated engine, then other locomotives within the same set of the derated locomotive may have throttle settings or other outputs of the engines of the other locomotives increased to compensate for the derated locomotive. The controller may not increase the output of the locomotives in another set of locomotives in the same vehicle group. For example, if the vehicles 104A-D are in one set and the vehicles 104E-F are in another set in the same vehicle group and the vehicle 104E has a derated engine, then the controller may direct the engine of the vehicle 104F in the same set to increase output while the outputs of the engines in the vehicles 104A-D of the other set are not changed or are not changed based on the derated locomotive.

As another example, the movements of different vehicles may be changed to account for the state of information of another vehicle. For example, if a first drone is not moving as expected, is derated, has a faulty battery, has a faulty propeller, has a reduced state of charge, and the like, relative to other drones in the same vehicle group, then that drone may not be able to move as quickly, as fast, and the like, as expected or desired. The controller can control other drones to slow down, change direction or altitude less rapidly, and the like, to account for the first drone and keep the group of drones moving as a cohesive unit and maintain coordinated movements of the drones relative to each other.

Figure 4:
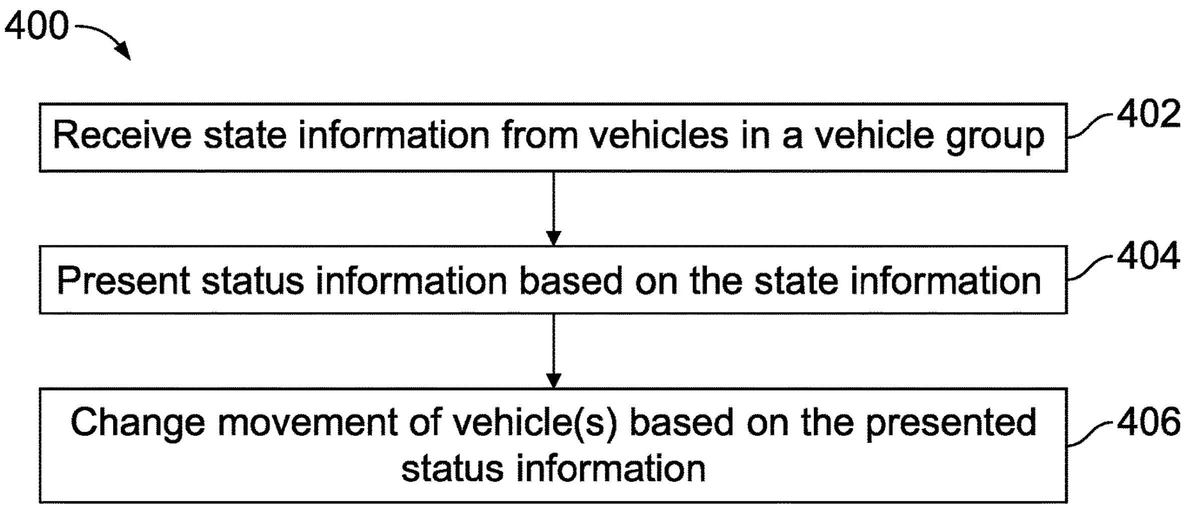
FIG. 4 illustrates a flowchart of one example of a method 400 for controlling operation of a vehicle group.

FIG. 4 illustrates a flowchart of one example of a method 400 for controlling operation of a vehicle group. The method can represent operations performed by the control system described herein. At step 402, state information is received from vehicles arranged in the vehicle group. The state information can represent one or more operational conditions of the vehicles. At step 404, statuses of the vehicles in the vehicle group are presented based at least in part on the state information that is received. This information can be presented via display on an input and/or output device. Presentation of this information can assist operators and/or the control system in addressing any faults or other problems and avoid further damage to components caused by the faults or problems that would be caused by waiting to fix the faults, derate the vehicle components, and the like. At step 406, movement of one or more of the vehicles in the vehicle group is changed based at least in part on the state information that is received. For example, a propulsion system of a vehicle may be derated, a heading of a drone may be changed so that the group or swarm of drones continues to move together in a defined pattern or arrangement even when one of more of the drones has reduced propulsive output due to a lower state of charge, and the like. Flow of the method may terminate or return to a prior step for repetition of one or more steps.

In one embodiment, the GUI may display iconography for plural vehicles in a vehicle system with associated operating parameters for each vehicle. The GUI information is populated from sensor signals and from databases holding information associated with the displayed vehicles. Additional input information may come in the form of manifest information (particularly weight being hauled), maintenance records, fuel type (as well as quantity and quality), and component specifications (such as the traction motor capabilities (HP per ton). This may be used to calculate available power and tractive effort, which may be compared to haulage weight to determine expected acceleration. Other input factors may include the engine operating load (RPM, for example) and the route grade (if any). The expected acceleration may be compared to actual or measured acceleration. Discrepancy may be noted for further analysis. However, the controller may determine if the available HP/tractive effort (as measured) will be sufficient to meet the demands across the entire predicted route. For example, if the vehicle system appears to be configured for sufficient power, but the measured available power is less than expected and is less than a maximum power requirement elsewhere (such as to climb a hill along the route) the controller sends a notification signal or warning. The cause of the underpowering may be identified and corrected. Related operational situations that may be detected include handbrakes still applied when attempting to move, locked axles, electrical shorts or electrical resistance, and the like. This may apply to electric vehicles operated from a third rail or catenary, as well.

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of a given item of equipment or environment. With respect to control policies, a neural network can receive input of a number of environmental and task-related parameters. These parameters may include the states described herein, data from various sensors, and the like. The neural network can be trained to generate an output based on these inputs, with the output representing an action or sequence of actions that the vehicle group should take to accomplish one or more goals. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models is obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

In one example, a vehicle control system may include a controller having one or more processors that can receive state information from a vehicle group having one or more vehicles. The state information may indicate an operational parameter of one of the vehicles. The controller may direct a display device to present one or more statuses of the one or more vehicles based at least in part on the state information that is received by the controller.

Plural vehicles in the vehicle group may be arranged relative to each other in a determined manner. The controller may present the arrangements of the plural vehicles relative to each other. The state information may indicate (a) a first state of a consuming device control signal communicated to one or more consuming devices of the vehicles that consume energy or fuel to generate power and/or (b) a second state of a generating device control signal communicated to one or more generating devices of the vehicles that are powered by the one or more consuming devices to generate electric energy. The controller may direct or control operation of one or more of the vehicles in the vehicle group based at least in part on the state information that is received. The controller may determine to derate the state of, or to switch to a safe operating mode for, the one or more vehicles responsive to the state information not being received during a window when the state information was expected to be received. The controller may change movement of one or more of the vehicles to account or compensate for a derated status or the relative location of the derated vehicle within the vehicle group.

The vehicles may be aerial drones, and the controller may change the movement of at least a first aerial drone responsive to at least a second aerial drone being associated with the degraded status to maintain coordinated movements of the aerial drones relative to each other. The state information may indicate a state of charge and/or a state of health of one or more energy storage devices or of one or more energy production devices of the vehicles in the vehicle group. The state information may indicate a state of health of a propulsion system of one of the vehicles in the vehicle group.

The controller may receive the state information for one or more non-propulsion-generating vehicles of the vehicle group. The controller may receive the state information for one or more energy tenders or fuel tenders that supply energy or fuel to one or more other vehicles in the vehicle group. The controller may receive the state information of the vehicles as including a health state of a thermal management system disposed on a vehicle in the vehicle group, and/or a temperature reading of a storage compartment within the vehicle in the vehicle group.

The controller may receive the state information of the vehicles as including an internal passenger volume temperature inside the vehicles, an amount of electric energy drawn by the vehicles, a health state of a leading propulsion-generating vehicle of the vehicles, and/or a passenger capacity of the vehicles. The controller may receive a unidirectional location of at least one of the vehicles in the vehicle group relative to other vehicles of the vehicles in the vehicle group for the vehicle group with the vehicles mechanically coupled with each other. The controller may receive a multi-directional location of at least one of the vehicles in the vehicle group relative to other vehicles of the vehicles in the vehicle group for the vehicle group with the vehicles mechanically separate from each other.

In another example, a method may include receiving state information from vehicles arranged in a vehicle group. The state information may indicate the operational condition of one or more of the vehicles. The method also may include displaying one or more statuses of the vehicles in the vehicle group based at least in part on the state information that is received.

The method also may include changing movement of one or more of the vehicles in the vehicle group based at least in part on the state information that is received. The movement may be changed by directing or controlling operation of the one or more vehicles to a derated state responsive to the state information not being received from the one or more vehicles. The movement may be changed to account for or compensate for a degraded status being indicated for the one or more statuses of the vehicles in the vehicle group.

In another example, a control system may include a controller having one or more processors that can receive state information from a vehicle group formed from vehicles. The state information may indicate an operational parameter of a first vehicle of the vehicles. The controller may direct a display device onboard a second vehicle of the vehicles in the vehicle group to present one or more statuses of the one or more vehicles based at least in part on the state information that is received by the controller. The controller may receive operator input from an operator onboard the second vehicle to change or control movement of the vehicle group based on the one or more statuses that are displayed on the display device by the controller.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," and the like, are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:

a controller having one or more processors configured to receive state information from a vehicle group having one or more vehicles, the state information indicating an operational parameter of one of the vehicles and a state of a component of a propulsion system of one of the vehicles, the controller is further configured to direct a display device to present one or more statuses of the one or more vehicles based at least in part on the state information that is received by the controller; and the controller is configured to direct or control operation of one or more of the vehicles in the vehicle group based at least in part on the state information that is received.

2. The system of claim 1, wherein plural vehicles in the vehicle group are arranged relative to each other in a determined manner, and the controller is further configured to present arrangements of the plural vehicles relative to each other.

3. The system of claim 1, wherein the state information indicates one or both of (a) a first state of a consuming device control signal communicated to one or more consuming devices of the vehicles that consume energy or fuel to generate power or (b) a second state of a generating device control signal communicated to one or more generating devices of the vehicles that are powered by the one or more consuming devices to generate electric energy.

4. The system of claim 1, wherein the controller is configured to direct or control operation of one or more of the vehicles in the vehicle group based at least in part on the state information that is received.

5. The system of claim 4, wherein the controller is configured to derate or switch the one or more vehicles to a safe operating mode responsive to the state information not being received during a window when the state information was expected to be received.

6. The system of claim 5, wherein the controller is configured to change movement of one or more of the vehicles to account for or compensate for a derated status or a relative location of the one or more of the vehicles having the derated status within the vehicle group.

7. The system of claim 6, wherein the vehicles are aerial drones, and the controller is configured to change movement of at least a first aerial drone responsive to at least a second aerial drone being associated with a degraded status to maintain coordinated movements of the aerial drones relative to each other.

8. The system of claim 1, wherein the state information is indicative of one or more of a state of charge or a state of health of one or more energy storage devices or of one or more energy production devices of the vehicles in the vehicle group.

9. The system of claim 1, wherein the state information is indicative of a state of health of a propulsion system of one of the vehicles in the vehicle group.

10. The system of claim 1, wherein the controller is configured to receive the state information for one or more non-propulsion-generating vehicles of the vehicle group.

11. The system of claim 1, wherein the controller is configured to receive the state information for one or more energy tenders or fuel tenders that supply energy or fuel to one or more other vehicles in the vehicle group.

12. The system of claim 1, wherein the controller is configured to receive the state information of the vehicles as including one or more of a health state of a thermal management system disposed on a vehicle in the vehicle group, or a temperature reading of a storage compartment within the vehicle in the vehicle group.

13. The system of claim 1, wherein the controller is configured to receive the state information of the vehicles as including one or more of an internal passenger volume temperature inside the vehicles, an amount of electric energy drawn by the vehicles, a health state of a leading propulsion-generating vehicle of the vehicles, or a passenger capacity of the vehicles.

14. The system of claim 1, wherein the controller is configured to receive a unidirectional location of at least one of the vehicles in the vehicle group relative to other vehicles of the vehicles in the vehicle group for the vehicle group with the vehicles mechanically coupled with each other.

15. The system of claim 1, wherein the controller is configured to receive a multi-directional location of at least one of the vehicles in the vehicle group relative to other vehicles of the vehicles in the vehicle group for the vehicle group with the vehicles mechanically separate from each other.

16. A method comprising:

receiving state information from vehicles arranged in a vehicle group, the state information indicative of an operational condition of one or more of the vehicles and a state of a component of a propulsion system of one of the vehicles, displaying one or more statuses of the vehicles in the vehicle group based at least in part on the state information that is received; and directing or controlling operation of one or more of the vehicles in the vehicle group based at least in part on the state information that is received.

17. The method of claim 16, further comprising changing movement of one or more of the vehicles in the vehicle group based at least in part on the state information that is received.

18. The method of claim 17, wherein the movement is changed by directing or controlling operation of the one or more vehicles to a derated state responsive to the state information not being received from the one or more vehicles.

19. The method of claim 17, wherein the movement is changed to account for or compensate for a degraded status being indicated for the one or more statuses of the vehicles in the vehicle group.

20. A system comprising:

a controller having one or more processors configured to receive state information from a vehicle group formed from vehicles, the state information indicating an operational parameter of a first vehicle of the vehicles and a state of a component of a propulsion system of the first of the vehicles, the controller is further configured to direct a display device onboard a second vehicle of the vehicles in the vehicle group to present one or more statuses of the one or more vehicles based at least in part on the state information that is received by the controller, the controller configured to receive operator input from an operator onboard the second vehicle to change or control movement of the vehicle group based on the one or more statuses that are displayed on the display device by the controller; and the controller is configured to direct or control operation of the first of the vehicles in the vehicle group based at least in part on the state information that is received.

* * * * *